(12) United States Patent
Todd

(10) Patent No.: US 7,383,210 B2
(45) Date of Patent: Jun. 3, 2008

(54) AUTOMATED SALES SUPPORT METHOD

(75) Inventor: Steven Todd, Westfield, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 11/240,043

(22) Filed: Sep. 30, 2005

(65) Prior Publication Data

US 2006/0031133 A1    Feb. 9, 2006

Related U.S. Application Data

(62) Division of application No. 09/850,073, filed on May 7, 2001.

(51) Int. Cl.
    *G06Q 30/00* (2006.01)
(52) U.S. Cl. ...................................................... 705/26
(58) Field of Classification Search .................. 705/26, 705/27
    See application file for complete search history.

(56) References Cited

U.S. PATENT DOCUMENTS 5,956,693 A    9/1999    Geerlings

| | | | |
|---|---|---|---|
| 2002/0007276 A1* | 1/2002 | Rosenblatt et al. | 704/260 |
| 2003/0095642 A1* | 5/2003 | Cloutier et al. | 379/88.13 |
| 2004/0039639 A1* | 2/2004 | Walker et al. | 705/14 |
| 2005/0097000 A1* | 5/2005 | Freishtat et al. | 705/26 |

OTHER PUBLICATIONS

British GAS Corp, Mr. Presswire. Coventry: Oct. 25, 2000, p. 1 http://proquest.umi.com/pqdweb?index=0&did=62888763 &SrchMode=1&sid=4&Fmt=3&VInst=PROD&VType=PQD &RQT=309&VName=PQD&TS=1195690965&clientId=19649.*

* cited by examiner

*Primary Examiner*—Jeffrey A. Smith
*Assistant Examiner*—Mila Airapetian

(57) ABSTRACT

A system and method for notifying salespersons of customer communications including a target item is provided. Individual customers are mapped to one or more salespersons. Target items of interest to a salesperson are defined and a salesperson is associated with a customer. For each salesperson, on-line communication channels are monitored for the occurrence of a communications involving a customer associated with the salesperson and including a target item defined by the salesperson. When such an occurrence happens, a notification is directed to the salesperson. Salesperson access to the system and customer access to the on-line communication channels requires authorization.

5 Claims, 5 Drawing Sheets

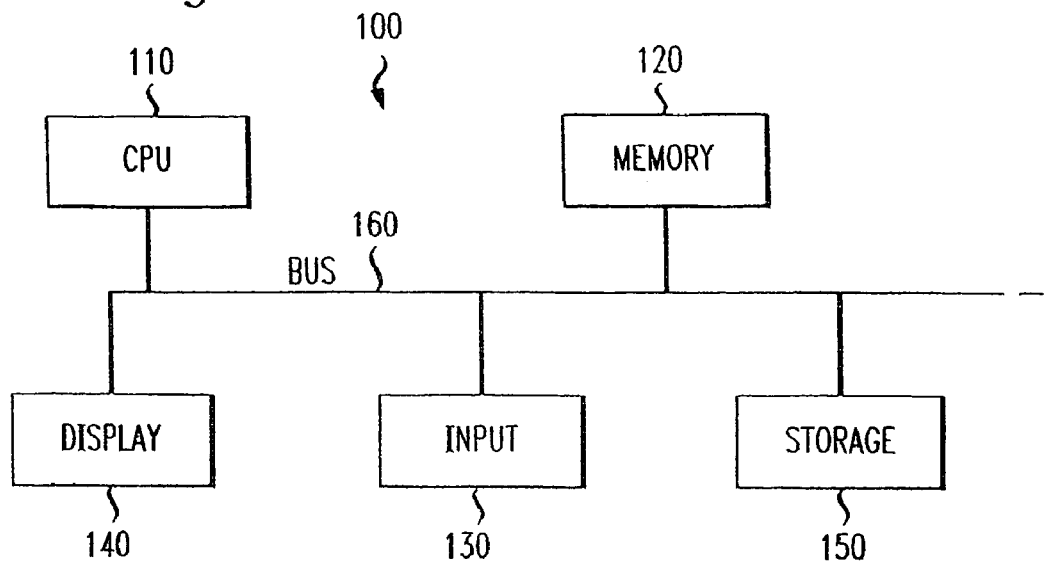
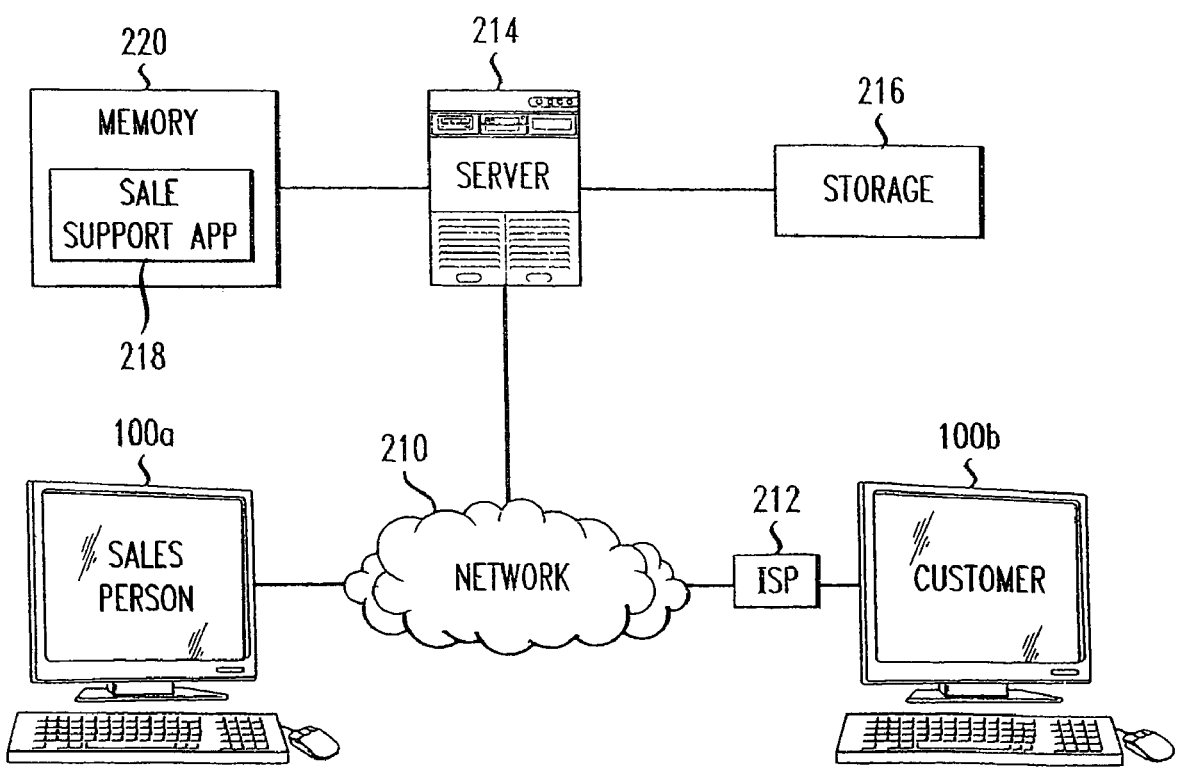

AUTOMATED SALES SUPPORT METHOD

This application is a divisional and claims the benefit of U.S. application Ser. No. 09/850,073, filed on May 7, 2001.

FIELD OF THE INVENTION

The invention relates to sales force automation, customer support, and contact management. More particularly, the invention relates to systems and methods for apprising a salesperson of the occurrence of selected consumer interactions with the salesperson's employer.

BACKGROUND OF THE INVENTION

Various strategies are employed by corporations to generate sales. Most typically, a corporation makes known its ability to produce certain goods through advertisements such as, newspaper ads, television ads, magazine ads, internet ads and directed mailings, among others. Once an initial sales lead is developed and/or a first sale finalized, maintaining customer relationships is critical to the continuation of the sales process. Therefore, an individual within a corporation's sales staff is typically assigned the task of supporting an individual customer. While at least one salesperson is typically assigned to each active customer, a customer may be supported by multiple salespersons. In addition, each salesperson may support zero, one, or multiple individual customers at any given time.

Throughout the customer relationship, salespersons may periodically notify assigned customers of established services, new service offers and general interest information, thereby maintaining open lines of communication and facilitating potential sales. Salespersons may also provide customers with status reports concerning customer-initiated requests and completed reports in reply to such requests. However, manually collating and tracking each of these customer-salesperson interactions is problematic, as the customer may deal with various salespersons from time-to-time, each of whom would have coordinate their efforts. Further, a customer may interact with various other representatives of the sales corporation, compounding the effort needed to collate and track customer-corporate representative interactions.

Customer Relationship Management (CRM) applications offer sales corporations improved sales performance and management of customer relationships as compared to manual tracking of customer-corporate representative interactions. Conventional CRM applications gather, collate and store data from corporate records created during customer-corporate representative interactions, such as, service telephone calls to a customer assistance center, sales transactions, and web site registration and usage. These conventional sales-force automation applications utilize the data that has been stored in corporate records to generate customized sales letters and facilitate access by salespersons to the stored information. Conventional sales-force automation applications also assist in the development of new sales leads, the sharing of information among/across sales staff, marketing staff and other corporate staff, and the storing of a customer's personal information. Analytical CRM Applications mine the data stored in corporate records for patterns and suggest appropriate, targeted marketing campaigns and sales pitches.

However, customers may communicate with a sales corporation in ever increasing manners via ever increasing methods, such as, e-mail, asynchronous on-line discussion groups (i.e., bulletin-boards/netnews and list servs), synchronous on-line discussion groups (a.k.a., real-time chat rooms), and on-line instant messaging, among others. Conventional CRM applications do not make provisions for the collection of customer data communicated via these on-line communication channels. Further, on-line requests for information from a customer may be responded to automatically by an electronic agent operated by the corporation. Accordingly, a salesperson assigned to a customer that communicates via such an on-line channel may be unaware of numerous customer interactions with the corporation. Such a lack of information may lead to gaps in corporate knowledge, resulting in non-existent communication or repetitive, unfocused communications with customers by salespersons. As a result customer relationships may be damaged and sales opportunities lost.

As such, it is important that a corporation and its sales force have the ability to automatically monitor communication to and from the corporation's customers across all communication channels. In this way, salespersons can remain knowledgeable of customers' interests and concerns, thereby increasing sales and marketing efficiency.

SUMMARY

In accordance with the invention, there are provided a method of and a system for automated sales support that apprises a salesperson of the occurrence of selected consumer interactions with the salesperson's employer via on-line communication channels. Individual customers are mapped to one or more salespersons. Target items of interest to a salesperson are defined and a salesperson is associated with a customer. For each salesperson, on-line communication channels are monitored for the occurrence of a communications involving a customer associated with the salesperson and including a target item defined by the salesperson. When such an occurrence happens, a notification is directed to the salesperson. Salesperson access to the system and customer access to the on-line communication channels requires authorization.

A second aspect of the invention features an automated sales support system that includes a system settings module, a channel monitor and a report generator. The system settings module permits a salesperson to set up at least one target and to associate with at least one customer. The channel monitor enables an on-line communication channel between the salesperson and the customer, analyzes the content of communications on the on-line communication channel for communications that are with the customer associated with the salesperson and that include content matching the target set up by the salesperson. When such communications are detected, the channel monitor generates notification of the same to the salesperson. The report generator receives queries from the salesperson and reports on communications in a history that match the parameters of the query. Thus, the salesperson is apprised of consumer interactions with the employer of the salesperson.

It is not intended that the invention be summarized here in its entirety. Rather, further features, aspects and advantages of the invention are set forth in or will be apparent from the following description and drawings. In addition, while the invention may be embodied in the forms illustrated in the accompanying drawings, it should be noted that the drawings are illustrative only. Various changes may be made in the specific embodiment illustrated and described while remaining within the scope of the appended claims and the contemplated invention.

BRIEF DESCRIPTION OF THE DRAWINGS

FIG. 1 illustrates an embodiment of a computer that is able to implement the method of the invention;

FIG. 2 illustrates an embodiment of networked computer system on which the invention may be implemented;

DETAILED DESCRIPTION

Figure 3:
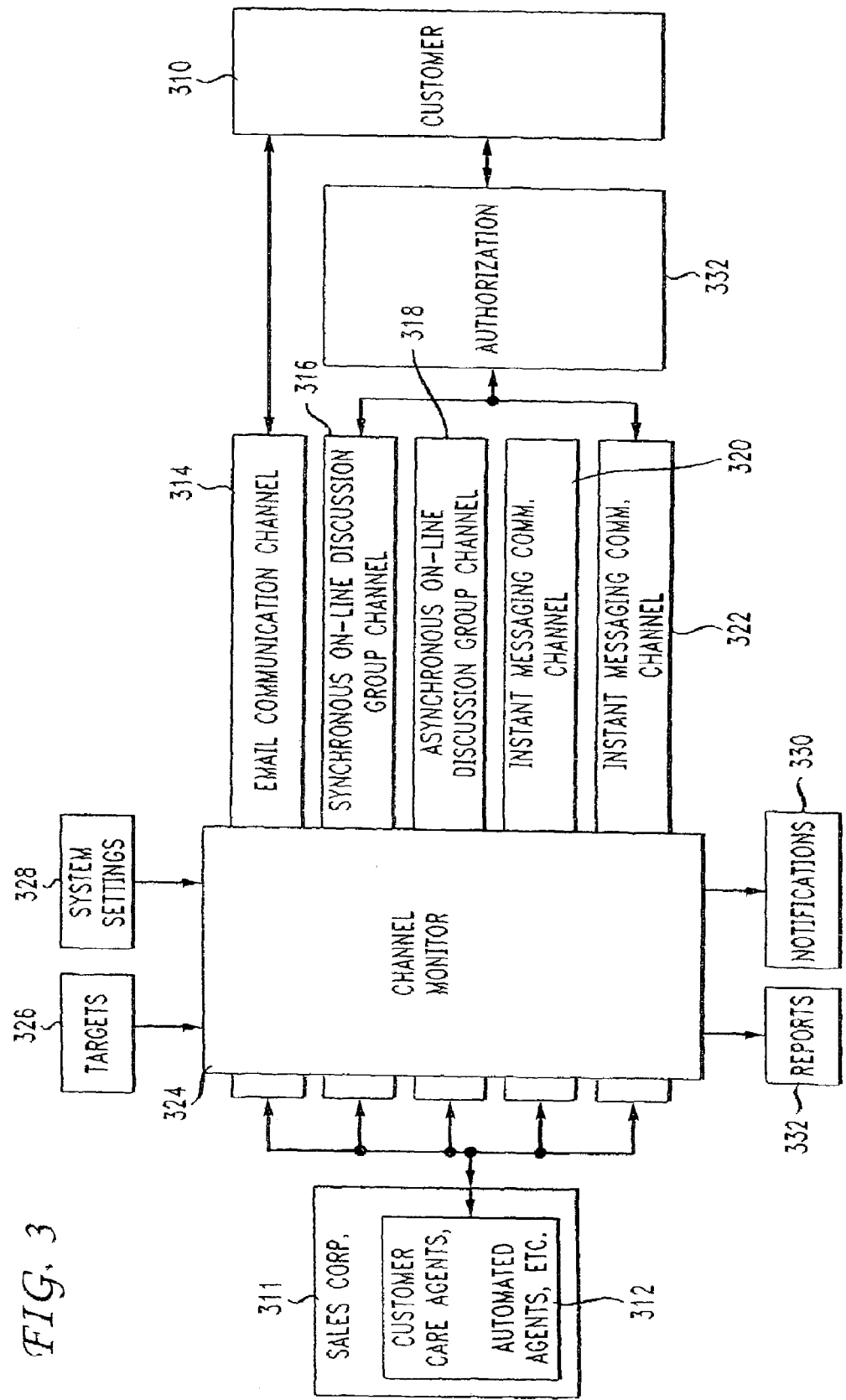
FIG. 3 is a high level overview of the automated sales support system of the invention.

According to an embodiment of the present invention, a sales automation system is provided that notifies a salesperson of the occurrence of selected targets within a customer's interactions with the salesperson's employer via on-line communication channels.

FIG. 1 illustrates a simplified block diagram of an embodiment of a computer system 100 employed by the present invention. The computer system 100 is configured to have a central processing unit (CPU) 110, a memory 120, an input device 130, a display 140 and storage 150 coupled via a system bus 160. The input device 130 may take the form of a keyboard, a computer mouse, voice activated response unit or other device that generates an output signal in response to a user interaction with the input device. The display 140 may be a cathode ray tube (CRT) display, a liquid crystal display (LCD), plasma display or other computer monitor that displays information. Storage 114 may be, for example, magnetic, optical, or magneto-optical storage. It is readily apparent that the computer system 100 illustrated in FIG. 1 is merely exemplary. Computer system 100 may be configured in a variety ways utilizing a variety of devices.

FIG. 2 is an illustrative embodiment of networked computer system in which the automated sales support system of the invention may be implemented. A corporate salesperson interacts with a first computer 100a. A customer of the corporation (e.g., a purchasing staff member of a customer corporation) interacts with a second computer 100b. Computers 100a and 100b are coupled via communication channels to network 210. In the illustrative embodiment, customer computer 100b is coupled to the network 210 through Internet service provider 212, while salesperson computer 100a is directly coupled to the network 210. Additional customers and/or salespersons may be linked to the automated sales support system in the same manner. Via this linkage, a customer may communicate with individual salespersons, support staff or electronic agents at a sales corporation (i.e. corporate representatives) with which the customer conducts business. A customer also may communicate with other customers that are networked to the automated sales support system. In alternative embodiments, the network may comprise a data network, a voice network, the Internet, a corporation's internal data network, or a combination of several networks. In each of these cases, computers 100a and 100b connect to the network 210 through various intermediaries well known in the art.

Server 214 also couples to data network 210. Server 214 is a general purpose computer programmed to provide the automated sales support application. In alternative embodiments, server 214 may only provide a portion of the automated sales support application and functions in conjunction with other portions of the application that are co-located on the salesperson computer and/or the customer computer. Server 214 also couples to storage device 216, such as a magnetic, optical, or magneto-optical storage device. Storage device 216 stores target data, system settings, completed reports, notification history, customer data, corporate records, and other information utilized by and generated by the system.

The automated sales support application 218, executing in memory 220 of server 214, is able to access the storage device 216 and provide requested information to salespersons and customers at computers 100a and 100b respectively. That information may include system settings, previously completed reports and a history of notifications provided to a salesperson. The automated sales support application 218 on server 214 also monitors communication between a customer and the corporation (i.e., any of the corporation's representatives). Upon detecting selected targets in a communication (i.e., items of interest within a communication), the server 214 thereafter directs notification to a salesperson associated with the customer that initiated the communication. Such notification is directed to the associated salesperson at his/her salesperson computer 102a. The notification may be a summary version of the communication of interest or the server 214 may, if desired, direct the entire, original communication to the salesperson computer 102a associated with the salesperson that is to be notified. Further, the automated sales support application may be configured by the salesperson so that notifications occur immediately or at specified times or intervals.

The automated sales support application 218 may also integrate the functional features of a conventional CRM application. In other words, a corporate representative utilizing the application may generate corporate records relating to an interaction with a customer. When a corporate record is created, the record is scanned to determine whether the record contains any targets for which a notification should be generated. If a target is within the corporate record, a notification is generated in the same manner as explained above with respect to the monitoring of on-line channels.

FIG. 3 is a high level overview of the automated sales support system of the invention. Illustrated is an embodiment of a system that can be used by a corporation to provide its sales personnel with the ability to monitor communications between the corporation and the corporation's customers across on-line communication channels. The system provides salespersons with notification upon detection of certain predetermined targets in communications on monitored communication channels. A customer 310 that wishes to communicate with a sales corporation 311 is able to do so over various on-line communication channels provided by the corporation to its customers. On-line communication channels may include: e-mail 314, asynchronous on-line discussion groups 316 (i.e., bulletin-boards/netnews and list servs), synchronous on-line discussion groups 318 (a.k.a., real-time chat rooms), on-line instant messaging 320, 322, and other on-line channels (not shown).

Individual on-line communication channels provided by the sales corporation may be available only to registered customers or may be available to both registered and unregistered customers. For example, e-mail communication channel 314 is a public communication channel available to all customers. In other words, any customer, potential or longstanding, registered or unregistered, is able to interface with the corporation directly via the public, email communication channel. Other communication channels 316-322 are restricted to the public and are available only to registered customers; these communication channels are known as restricted communication channels.

Customer authorization is required prior to providing full customer access to the restricted communication channels 316-322. To obtain access to a restricted communication channel, customer 310 interfaces with an authorization unit 323, which resides at the central computer server providing the automated sales support application and connected to the communication channel. Alternatively, the authorization unit may be located at an intermediate computer serving the communication channel. As is known in the art, the authorization unit 323 is capable of registering first time users of a particular communication channel, by requesting a username and password, before permitting access to the communication channel. Once successfully registered, the automated sales support software assigns a salesperson to the newly registered customer. The salesperson's employer (i.e., management personnel) may also initially assign a salesperson to a customer. That is, management personnel may instruct the automated sales support software to assign individual Customer B to Salesperson A (or more likely, assign all employees of Company B to Salesperson A). This associated salesperson will then receive notifications of the customer's interactions with the corporation, as explained below, and is responsible for maintaining the customer-corporation sales relationship. Alternatively, first time registration of a customer may require that a salesperson assigned to the customer enable the customer's access to restricted communication channels by establishing an initial username and password.

Authorization unit 323 verifies the identity of a first time customer or registered customer attempting to access a restricted communication channel against a list of registered customers of the corporation, which may be stored in a database. A customer is required to identify himself/herself (e.g., log on) each time the customer wishes to access the full functionality of a restricted communication channel (e.g., interact with a discussion group on the asynchronous on-line discussion channel). Once logged-on to a restricted communication channel, the customer may securely converse with customer peers and/or corporation representatives (e.g., care center agents, automated agents). At the same time, since the customer is logged-on, the automated sales support system is able to associate distinct communications with an individual customer and forward notifications to the salespersons associated with the individual customer. For public communication channels, such as e-mail, the automated sales support system is able to determine communications from distinct customers based on a known customer's email address. First time customers communicating via a public communication channel are assigned to/associated with a salesperson selected by the system.

The automated sales support system provides four basic functions: establishment of communication channels between the customer and the sales corporation, association of the sales corporation's sales personnel to the customer corporation's purchasing staff, definition of targets to be found within the customers' communications, and notification, queries and reporting of targets found in customer communications.

Communication channels 314-322 connect to channel monitor 324. The channel monitor 324 automatically analyzes the content of communications on the communication channels to and from a customer in an effort to detect defined target items 326 pre-programmed by a salesperson associated with the customer. The channel monitor 324 analyzes communication directed from the customer to the corporation and communication directed from a corporate representative to the customer. The channel monitor 324 thereafter informs the appropriate salesperson/s of the sales force 312 when a target is found in a communication on a communication channel. A salesperson may be an automated agent that automatically responds to specific customer communications or a sales staff member.

Target items 326 are preprogrammed items of interest that may be found in customer communications with the sales corporation. Target items may include key alphanumeric characters/strings/emoticons (e.g.,?, !, help, :-||, :-(, :'-(,#.-o), timely product offerings provided by the sales corporation (e.g., the name of the latest service offer), and special codes provided by a salesperson (e.g., 411, 911, KILROY and other codes). A salesperson is able to individually control the selection of target items according to his/her personal preference. For example, a certain salesperson may not desire to be informed of communications containing a question mark, which should be better sent to a more technically oriented salesperson or technical consultant assigned to the customer. At the same time, this certain salesperson, who handles only customer complaints, may desire to be informed of communication containing an exclamation mark. The selection of target items in the application is extendable so that a salesperson can select targets for each individual customer to which the salesperson is assigned.

Each salesperson is also able to control how he/she will be informed of the customer's interactions with the corporation. A salesperson may request to be informed differently depending on the interaction type. For example, a salesperson may prefer to be notified via different media (e.g., electronic mail, page, telephone, voice mail), via an immediate or delayed report, and/or via per-interaction or summarized reports, for different customer-corporation communications. Such preference information is stored as part of the system settings 328, which sets up the interface between a salesperson and the automated sales support application. The system settings may also include a list of salespersons authorized to use the software, a list of authorized customers that is utilized in conjunction with the authorization unit, and other personlized interface features, such as, the coloring and positioning of the displayed graphical user interface of the automated sales support application.

Notifications 330 stores a history of the notifications that have been detected and generated by the channel monitor in response to customer communication with the corporation. Reports 332 is a report generator that contains preprogrammed reports that can be run on the notification history and other stored information associated with the automated sales support application. The report generator can also be personlized by a salesperson to generate individualized reports that include only selected information from the total information available in the notification history. In addition, the report generator is able to archive reports that have been generated for delivery at some later time.

Delivery of customer-corporation communication notifications to the appropriate salesperson is dependent on an accurate mapping of an individual customer to an individual member of the sales corporation's sales staff. System settings 328 includes the mapping of salesperson to customer. When an individual customer interacts with the corporation (for whatever reason), the salesperson assigned to/associated with that individual customer is informed of the interaction. In this manner, the salesperson will be provided with the knowledge of all communications between the customer and the corporation. The appropriate salesperson is informed of the time, date, and contents of the communication.

For example, a corporation can establish on-line (electronic) discussion groups and provide its customers with permission to access these discussion groups on a restricted communication channel. Customers must identify themselves each time (e.g., log on) before assessing accessing a discussion group on a restricted channel. Within a discussion group, customers may read earlier posts and create replies and/or new posts. When an individual customer creates a reply or a new post within a corporation provided on-line discussion group, the content of that post is be automatically analyzed by the channel monitor. If the content of the post contains any of a number of pre-defined target items, the salesperson(s) assigned to that individual customer is informed by a notification. The notification may include the time, date, and some form of the content of the post on the on-line discussion group.

Figure 4:
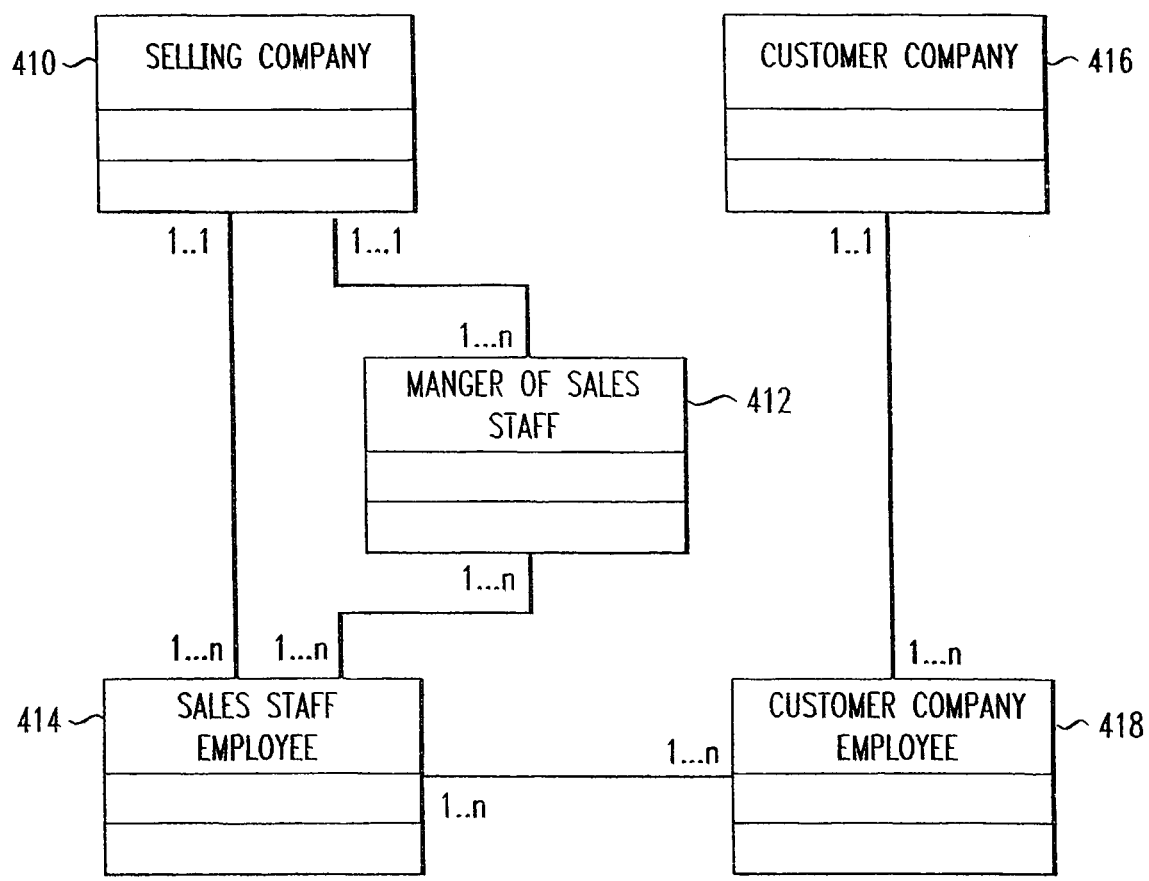
FIG. 4 is an illustrative mapping of a sales corporation's sales personnel to a customer corporation's purchasing staff.

FIG. 4 is an illustrative mapping of a sales corporation's sales personnel to a customer corporation's purchasing staff. The exemplary database arrangement details the relationship between a customer corporation and its customer employees, and a sales corporation and its sales managers and sales employees that are to be notified when item of interest is conveyed on a monitored on-line communication channel. This association allows a salesperson, who is assigned to a specific customer, to remain apprised of that customer's interests and concerns, as reflected through the customer's on-line interactions with corporation representatives.

On the sales corporation side, the automated sales support application allows numerous selling companies 410 to be established. Each selling company 410 is a subset of the sales corporation, for example, a subsidiary or department of the sales corporation. For each selling company 410, corporate management associates zero, one or multiple managers of the sales staff 412. Managers of the sales support staff 412 oversee sales staff employees 414, whose records are also set up in the automated sales support application for each selling company 410. Zero, one or multiple sales staff employees can be associated with any one selling company 410 or manager of sales staff 412.

On the customer corporation side, the automated sales support application allows numerous customer companies 416 to be established. Each customer company 416 represents a unique customer corporation that has a business relationship with the sales corporation. For each customer company 416, corporate management of the sales corporation associates zero, one or multiple customer company employees 418. Customer company employees 418 are the purchasing staff personnel of the customer corporation that act as contacts persons for their employer. Customer company employees 418 are the persons with which a business relationship must be maintained in order to facilitate and generate sales orders. While setting up either the sales staff employees 414 or the customer company employees 418, the association between these two sets of employees 414 and 418 is established through, for example, a drop down table. Zero, one or multiple sales staff employees 414 can be associated with any individual customer company employee 418. In the same manner, zero, one or multiple customer company employees 418 can be associated with any individual sales staff employees 414.

Thus, specific sales staff employees are associated with specific customer companies and with specific customer company employees. Based on these associations, sales staff employees and managers of sales staff can be notified of the occurrence of on-line communications with the sales corporation that include pre-programmed targets. The association of sales staff employees (i.e., salespersons) to customer company employees (i.e., customers) can also be used to limit the ability of a salesperson to query and receive reports generated by the automated sales support application to only those regarding associated customer companies 416 and customer company employees 418. In other words, the association of a salesperson to a customer authorizes the salesperson to query and receive reports concerning the customer.

For security purposes, the automated sales support application may request that management staff authenticate themselves prior to inputting/amending salesperson-customer associations. If authorized, management staff are able to establish/terminate the associations as described further below with respect to FIG. 5. At least one sales-corporation employee (i.e., a salesperson, e.g., an employee of the sales staff) should be assigned to or associated with each customer corporation to ensure that customer communications with the sales corporation are duly monitored and appropriately handled.

Figure 5:
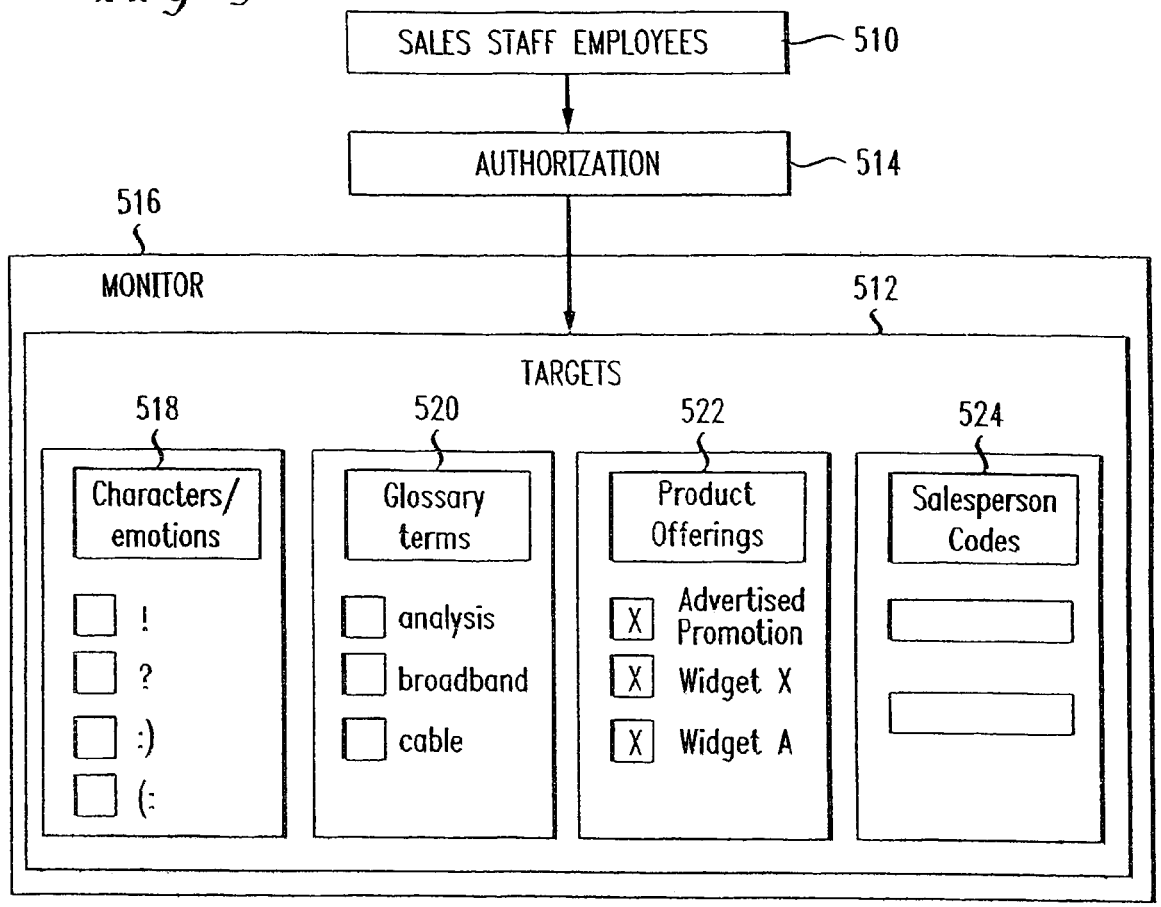
FIG. 5 illustrates a portion of the salesperson interface within the automated sales support system, specifically a target definition menu that allows a salesperson to select target items to be detected within a customer's on-line communications.

FIG. 5 illustrates a portion of the salesperson interface within the automated sales support application, specifically a target definition menu that allows a salesperson to select target items to be detected within an associated customer's on-line communications with the sales corporation. Sales staff employees (i.e., salespersons) 510 of a sales corporation define the target items 512 to be detected within a customer's on-line communications with the sales corporation. When a target item in a communication is detected, the sales staff employee that selected notification of the occurrence of the target item is notified of such occurrence. As a preliminary step to programming target items, a sales staff employee may be required to authenticate himself/herself with the automated sales support application. Thus, the sales staff employee may interact with an authorization unit 514, inputting a user identification and password, as is well known in the art.

Once a salesperson is authorized to program target items, the target items 512 are presented to the salesperson via a graphical user interface (GUI) provided on a monitor 516 of the salesperson's computer. The salesperson has the ability to define the target items to be detected within the customer's on-line communications. Target items 512 are items of interest that may be found in customer communications to the sales corporation. Target items may include key alphanumeric characters/strings/emoticons (e.g., !, ?, help, :), :( ) 518, terms/strings from a glossary (e.g., analysis, broadband) 520, timely product offerings provided by the sales corporation (e.g., Advertised Promotion, Widget X) 522, and special salesperson codes (e.g., 411, 911, KILROY and other codes) 524. Characters/emoticons 518, glossary terms 520 and product offerings 522 are all pre-programmed in the system settings of the application. The salesperson is able to provide self-defined targets to the system using the special salesperson codes 524 (e.g., via a text-input field).

A salesperson is able to individually control the selection of target items according to his/her personal preference, for example, by selecting a check box associated with any single target item. As illustrated in FIG. 5, no alphanumeric characters/emoticons have been enabled as target items; however, Advertised Promotion, Widget X and Widget Z have been enabled as target items. Preferably, the target items selected by a salesperson apply to all customers associated with the salesperson. Alternatively, the automated sales support application can be extended so that a salesperson can select unique targets for each individual customer to which the salesperson is assigned. Once targets have been programmed, the automated sales support application automatically, without any salesperson's intervention, searches for timely and topical targets defined by the salesperson (e.g., new offers, promotions).

Figure 6:
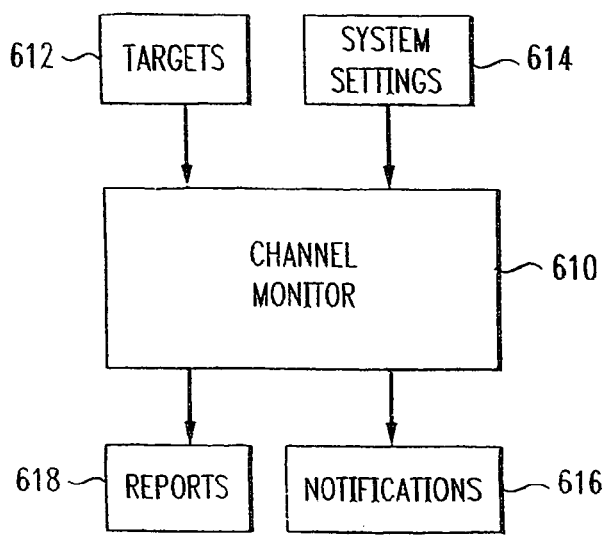
FIG. 6 illustrates, in general, the functionality provided by the automated sales support application of the invention

FIG. 6 illustrates, in general, the functionality provided by the automated sales support application. Specifically, the application includes a channel monitor 610 that watches communications sent and received on on-line communication channels. Based on stored targets 612 and system settings 614 established by salespersons, the application determines whether the received communication has any item of interest to a salesperson associated with the customer communicating with the sales corporation. If items of interest are located in a communication, the application generates a notification message 616 to the appropriate salesperson. The application also has a reports module 618 that allows querying by authorized salespersons to generate reports that detail the history of targets found in customer communications. (i.e., what, if any, targets have been found within a customers' on-line communications). Only salespersons who have been assigned to or associated with a customer have the ability to learn of targets within that customer's communications with the sales corporation.

The system settings 614 also permits programming of parameters for the control of the timing, content and method of the notification to the salesperson. Notifications can be immediate or delayed, summarized or completely detailed, in response to a communication that requires a notification to be issued. For example, a summary report may be delivered daily, weekly, or monthly, as chosen by the salesperson. In addition, the salesperson can request to be notified differently depending on the on-line communication channel used by the customer and depending on the target(s) found. For example, a salesperson may be notified via electronic mail, pager, telephone, voice mail if multiple targets are detected.

The various components and subsystems generally illustrated in FIG. 6 may be implemented as software modules executing on general purpose computer server. A single processor, such as a mini-mainframe connected to a number of individual terminals can be used when the salespersons are located in a close proximity. For example, a number of automobile salespeople may be located a single dealership, each having their own terminal to support their sales activities. Alternatively, separate processors or computing platforms may be used for each component of the system or for various combinations of components. When, for example, the target module is detached from the channel monitor, separate processor elements may be used by the modules.

Figure 7:
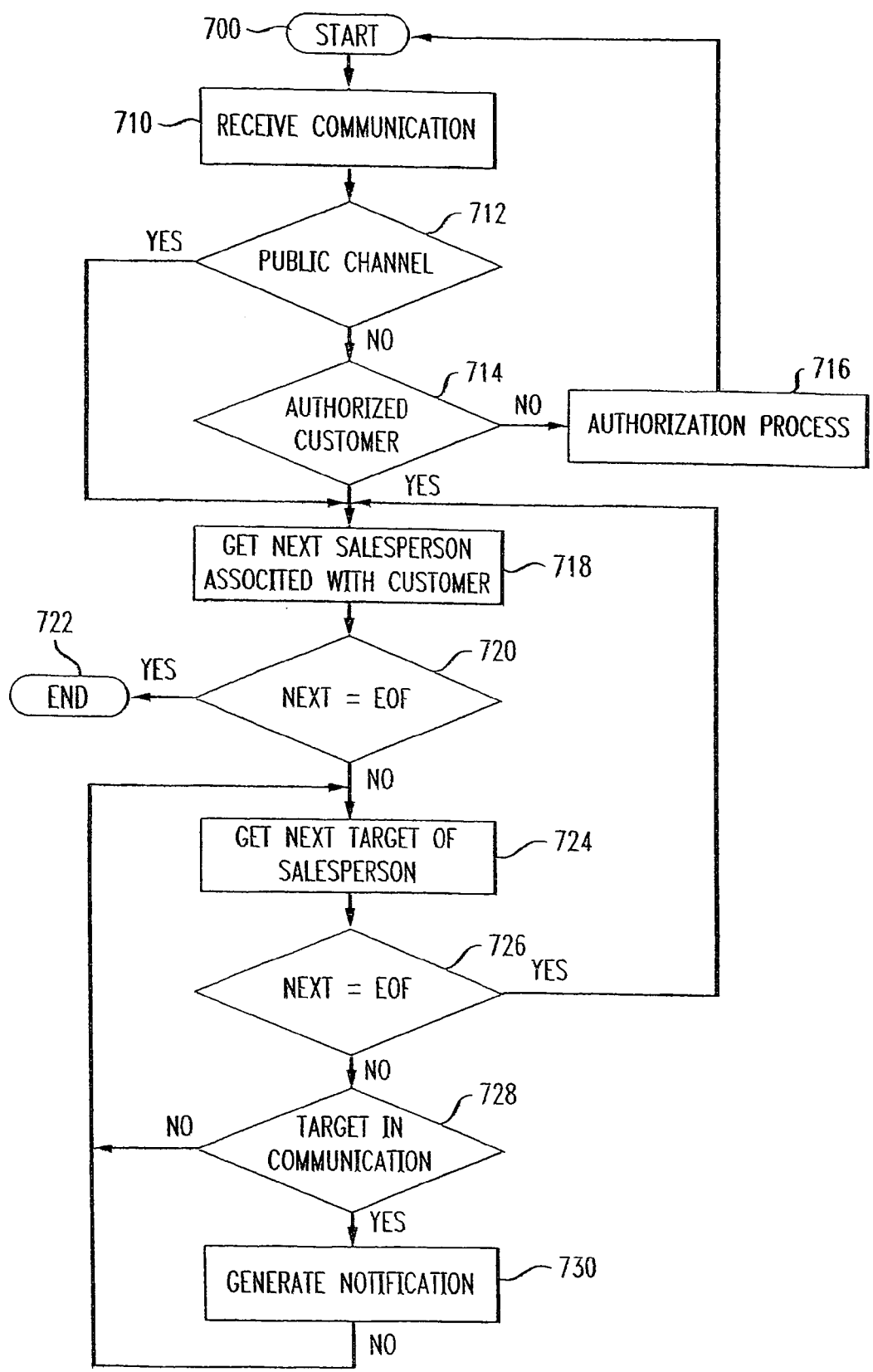
FIG. 7 is a flow chart illustrating channel monitoring processes in an embodiment of the automated sales support application of the invention.

FIG. 7 is a flow chart illustrating channel monitoring processes in an embodiment of an automated sales support application according to the principles of the invention. At step 700 the channel monitor processes begins to watch communication between a customer and the corporation (i.e., any one of the corporation's salespersons) for the occurrence of communication including a target. In general, the channel monitoring processes direct notification to an appropriate salesperson upon detecting selected communication targets of interest. At 710 the automated sales support application receives a communication from a customer on a communication channel. At step 712, the application determines if the on-line communication is on a public, on-line communication channel or a restricted, on-line communication channel.

If the on-line communication channel is not a public, on-line communication channel (i.e., is a restricted, on-line communication channel), the application advances to step 714 and checks if the customer communicating with the corporation is an authorized customer. If the customer is not an authorized customer, an authorization process is undertaken 716 and the application then again waits to receive a communication from a customer on the on-line channel 710. If the customer is an authorized customer (i.e., the customer has already been identified), the application advances to the start of a communication target checking stage 718. If the on-line communication channel is a public, on-line communication channel, the customer communicating with the corporation is known and identified via the email address, and the application advances to the start of a communication target checking stage 718.

At the start of a communication target checking stage 718, the application determines the next salesperson associated with the customer that initiated the communication. If the next salesperson is the end of salespersons marker 720, the application ends the communication target checking stage 722. If the next salesperson is not the end of salespersons marker, the application determines the next target for the salesperson associated with the customer 724. If the next target is the end of targets marker 726, the application loops back to step 718 to determine the next salesperson associated with the customer. If the next target is not the end of targets marker, the application checks for the target in the communication from the customer. If the target is not found in the communication from the customer 728, the application loops back to step 720 to determine the next target. If the target is found in the communication from the customer 728, the application generates a notification directed to the salesperson for the communication 730 and then loops back to step 720 to determine the next target. Thus, the application checks a customer communication for each target established by each salesperson associated with the customer that initiated the communication and generates notifications to the appropriate salespersons upon find targets in communications between a customer and a sales corporation.

Although illustrative embodiments of the present invention and various modifications thereof have been described in detail herein with reference to the accompanying drawings, it is to be understood that the invention is not limited to these precise embodiment and the described modifications, and that various changes and further modifications may be effected therein by one skilled in the art without departing from the scope or spirit of the invention as defined in the appended claims.

I claim:

1. A method of alerting a salesperson of consumer interactions with an employer of the salesperson, the method comprising:

receiving from the salesperson a selection of a target item for an individual customer to which the salesperson is assigned;

monitoring a plurality of on-line communication channels for an occurrence of a communication from the customer to the employer and including the target item defined by the salesperson; and notifying the salesperson upon the occurrence,
wherein the communication is between the customer and a representative of the employer or the customer and a customer peer.

2. A method of alerting a salesperson of consumer interactions with an employer of the salesperson, the method comprising:
   receiving from the salesperson a selection of a target item for an individual customer to which the salesperson is assigned;
   monitoring a plurality of on-line communication channels for an occurrence of a communication from the customer to the employer and including the target item defined by the salesperson; and
   notifying the salesperson upon the occurrence,
wherein the salesperson in an electronic agent.

3. A method of alerting a salesperson of consumer interactions with an employer of the salesperson, the method comprising:
   receiving from the salesperson a selection of a target item for an individual customer to which the salesperson is assigned;
   monitoring a plurality of on-line communication channels for an occurrence of a communication from the customer to the employer and including the target item defined by the salesperson; and
   notifying the salesperson upon the occurrence, wherein the step of monitoring comprises: receiving the communication from the customer on one of the plurality of on-line communication channels;
   determining whether the salesperson is associated with the customer; and determining whether the target item for the salesperson is contained in the communication that has been received from the customer when the salesperson is associated with the customer.

4. The method of claim 3, wherein the step of monitoring further comprises:
   determining whether the communication is on a public, on-line communication channel or a restricted, on-line communication channel; and
   requesting authorization information when the communication is on the restricted, on-line communication channel.

5. A method of alerting a salesperson of consumer interactions with an employer of the salesperson, the method comprising:
   receiving from the salesperson a selection of a target item for an individual customer to which the salesperson is assigned;
   monitoring a plurality of on-line communication channels for an occurrence of a communication from the customer to the employer and including the target item defined by the salesperson; and
   notifying the salesperson upon the occurrence,
   wherein target items comprise alphanumeric characters, alphanumeric strings, emoticons, names of product offerings or codes.

* * * * *